United States Patent [19]
Sakurai et al.

[11] Patent Number: 5,787,851
[45] Date of Patent: Aug. 4, 1998

[54] INTAKE CONTROL SYSTEM

[75] Inventors: Kenichi Sakurai; Masami Wada; Masato Nishigaki, all of Iwata, Japan

[73] Assignee: Yamaha Hatsudoki Kabushiki Kaisha, Iwata, Japan

[21] Appl. No.: 363,746

[22] Filed: Dec. 23, 1994

[30] Foreign Application Priority Data

Dec. 29, 1993 [JP] Japan ................................. 5-353184
Dec. 29, 1993 [JP] Japan ................................. 5-353185

[51] Int. Cl.⁶ ..................................................... F02B 29/00
[52] U.S. Cl. ........................................ 123/184.55; 123/306
[58] Field of Search ..................... 123/184.24, 184.27, 123/184.37, 184.34, 184.42, 184.45, 184.47, 184.53, 184.55

[56] References Cited

U.S. PATENT DOCUMENTS

| | | | |
|---|---|---|---|
| 4,612,903 | 9/1986 | Urabe et al. | 123/184.45 |
| 4,643,136 | 2/1987 | Ura et al. | 123/184.42 |
| 4,660,530 | 4/1987 | Sugiyama et al. | 123/184.42 |
| 4,854,271 | 8/1989 | Miyano et al. | 123/184.55 |
| 4,862,840 | 9/1989 | Matsunagawa et al. | 123/184.55 |
| 4,875,438 | 10/1989 | Suzuki et al. | 123/184.55 |
| 5,551,392 | 9/1996 | Yamaji et al. | 123/306 |

*Primary Examiner*—Marguerite McMahon
*Attorney, Agent, or Firm*—Knobbe, Martens, Olson & Bear LLP

[57] ABSTRACT

A number of embodiments of V-type internal combustion engines having an induction system which provides variable length sections for serving each combustion chamber, with each section being tuned to provide optimum charging efficiency for a different engine running speed. In addition, a flow-controlling valve is provided in the induction passages adjacent the combustion chamber and is movable between a nonrestricting flow position and a position wherein the flow is redirected to generate turbulence in the combustion chamber. The induction system is designed so as to provide a compact assembly and yet permit efficient induction and combustion under a wide range of engine speed and load conditions.

53 Claims, 13 Drawing Sheets

INTAKE CONTROL SYSTEM

BACKGROUND OF THE INVENTION

This invention relates to an intake control system for an engine, and more particularly to an improved induction system and control therefor that improves the performance of the engine throughout its entire speed and load ranges.

As is well known, the design of the induction system for an engine has a substantial effect on its performance. Unfortunately, induction systems that provide good high-speed performance and maximum power outputs provide extremely poor running under low and mid-range conditions. The reason for this is that the induction system, in order to provide maximum output, should have high volumetric efficiency. This requires an induction system that delivers the charge into the combustion chamber at a relatively high velocity and with very low flow restriction and turbulence. However, this type of induction system causes the air charge to enter the combustion chamber at a very slow rate when running at low and mid-range speeds. In addition, the charge flows into the chamber in such a way that very little turbulence is generated. As a result, flame propagation is slow and poor performance, particularly in the areas of fuel economy and exhaust emission control, result.

In order to improve the performance throughout the entire speed and load ranges, various types of variable intake systems have been proposed. These systems are variable in effect, so that they function efficiently under both high- and low-speed conditions. Frequently, this variation in tuning of the induction system is achieved by varying the effective length of the induction system. These arrangements are very effective for their purpose.

However, the basic configuration of the ports which serve the engine with such variable systems is normally such that the port is substantially unrestricted and does not induce any swirl or tumble to the intake charge. As a result, even though the flow velocity may be increased at low speeds, insufficient turbulence is generated to the charge so as to achieve the desired flame propagation.

Other types of induction systems have been proposed that include flow modifying arrangements that are disposed in either the intake passage or the intake port adjacent the intake valve. These systems use a type of flow control valve which can be positioned so as to redirect the charge entering the combustion chamber under low speed and low load conditions to generate the desired type of turbulence. Again, these systems are effective for their purpose, but do not completely solve the problem of maintaining optimum efficiency under all running conditions.

It is, therefore, a principal object of this invention to provide an improved intake control system for an internal combustion engine.

It is a further object of this invention to provide an improved induction system for an engine that can improve the performance under all running conditions.

It is a further object of this invention to provide an induction system for an engine which provides not only variable tuning for varying engine speeds and loads, but also which can introduce tumble and/or swirl into the intake charge under certain running conditions so as to further increase the turbulence in the combustion chamber.

As has been noted, one way of improving the charging efficiency of an engine throughout the entire load and speed ranges is to provide an induction system that has variable effective length depending on the engine running condition. The types of arrangements employed for achieving these variable lengths are, however, rather complicated and cumbersome. With the growing demand for low hood lines to improve air resistance of the vehicle powered by the engine and the added accessories in the engine compartment, these complicated induction systems are difficult to employ.

It is, therefore, a still further object of this invention to provide an improved variable induction system which is compact in construction.

One way in which the variable length induction system is achieved is by providing pairs of intake passages that serve each chamber of the engine. One passage is tuned for highspeed running and the other passage is tuned for low-speed or mid-range running. The flow through the passages is controlled by means of a throttle valve that is positioned normally in the high-speed passage and which is closed except when the engine is running at high speed.

With this type of arrangement, however, it has been the normal practice to place the passages in side-by-side relationship. As a result, in order to achieve a single throttle valve shaft for multiple cylinders, the throttle valve shaft has passed through all of the induction passages. Thus, even though there is no throttle valve on the shaft, it still passes through the non-controlled induction passages and obstructs the flow therethrough.

It is, therefore, a still further object of this invention to provide an improved variable length induction passage having two passages of different lengths for each of multiple cylinders and wherein a flow controlling throttle valve arrangement is provided that does not obstruct the noncontrolled intake passages.

In conjunction with the speed control for the engine, and particularly those having plural intake passages of different lengths serving each combustion chamber of the engine, in addition to the controlling throttle valves in some of the intake passages, there is also provided a main throttle valve for the engine. Frequently, the individual branch passages terminate in a common plenum chamber, and this plenum chamber has an atmospheric air inlet. This type of arrangement, particularly if compact, presents some difficulties in positioning and controlling all of the necessary throttle valves.

It is, therefore, a still further object of this invention to provide an improved throttle valve arrangement for a variable intake induction system having a plenum chamber and individual different length runners contained served by the same plenum chamber.

If the engine is provided with an induction system having both a plenum chamber and a plurality of different length intake passages for each cylinder, then the induction system obviously becomes quite complicated and bulky.

It is, therefore, a still further object of this invention to provide an improved and compact induction system for an engine having variable length intake passages serving each combustion chamber and all being served by a common plenum chamber.

One way in which a compact construction can be achieved is by placing the plenum chamber closely adjacent the cylinder head which it serves. The intake passages then extend in a curved or U-shaped fashion from the cylinder intake ports into the plenum chamber. However, in order to achieve the desired length, it is necessary to extend the intake passages into the plenum chamber for a substantial length. This provides certain difficulties in maintaining a low overall length for the plenum chamber.

It is, therefore, a still further object of this invention to provide an improved induction system of this type wherein the plenum chamber may be maintained of a relatively short length, but nevertheless long intake passages can be provided.

SUMMARY OF THE INVENTION

A first feature of this invention is adapted to be embodied in an induction control system for supplying a charge to an engine combustion chamber that comprises intake passage means terminating at valve seat means in the combustion chamber. The intake passage means has first and second sections, each tuned to provide optimum charging efficiency at a different engine running speed. Throttle valve means are provided in at least one of the sections controlling the flow through the one section. Flow control valve means are provided in the intake passage means and is movable between a first position wherein the flow entering the combustion chamber flows in a first flow path and a second position wherein the flow enters the combustion chamber in a second flow path.

A number of additional features of the invention are adapted to be embodied in an induction system for an internal combustion engine having a cylinder head with a plurality of intake ports formed in an outer surface thereof for supplying an intake charge to a plurality of combustion chambers formed in part by the cylinder head. The induction system comprises a manifold having a plurality of runners, each extending at one end from the intake ports in a common section to first and second branch sections, each of a different length.

In accordance with one of these additional features, all of the first branch sections are aligned in a direction extending parallel to the cylinder head outer surface, and a single throttle valve shaft extends through all of the first branch sections and is spaced from and does not intersect the second branch sections. A plurality of flow controlling throttle valves are each fixed to the throttle valve shaft in a respective one of the first branch sections for controlling the flow therethrough.

In accordance with a further additional feature of the invention, all of the first and second branch sections terminate in a common plenum chamber having an atmospheric air inlet in which a first manually operated flow controlling throttle valve is positioned. A plurality of secondary, automatically controlled throttle valves are each positioned in a respective one of the first branch sections.

In accordance with a still further additional feature of the invention, the common section of the runners extends in a first direction away from the outer surface of the cylinder head and curves into the pair of branch sections. The branch sections extend in generally side-by-side relationship to each other and in the same general direction as the common section.

In accordance with a final of these additional features, the first and second branch sections each terminate in a common plenum chamber having an atmospheric air inlet. The longer of the branch sections spaced from at least one end of the plenum chamber all extend generally parallel to each other and transversely to the plenum chamber. The end one of the longer branch section adjacent the end of the plenum chamber is disposed to extend in part longitudinally in the plenum chamber for permitting the end of the plenum chamber to be smaller than the remainder of the plenum chamber.

DETAILED DESCRIPTION OF THE PREFERRED EMBODIMENTS OF THE INVENTION

Figure 1:
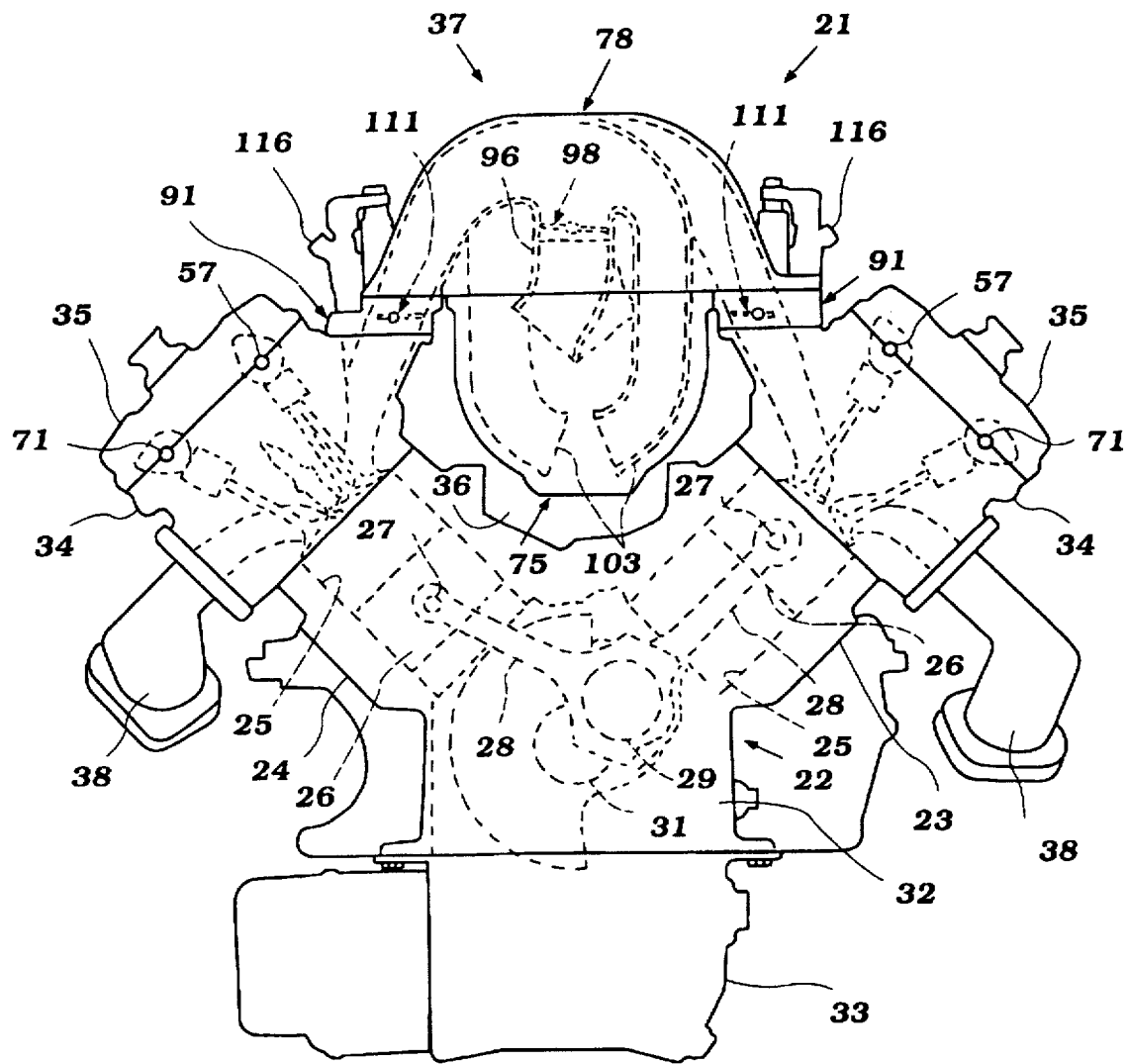
FIG. 1 is a front elevational view of an internal combustion engine constructed in accordance with an embodiment of the invention.

Referring now in detail to the drawings and initially to FIG. 1, an internal combustion engine constructed in accordance with an embodiment of the invention is indicated generally by the reference numeral 21. As will become apparent, the engine 21 is of the V-8 type and operates on a four-stroke principle. Although the invention is described in conjunction with such an engine, it will be readily apparent to those skilled in the art that certain facets of the invention may be employed with engines having other cylinder numbers and other cylinder configurations. It is believed well within the scope of those skilled in the art to understand how the features of the invention may be employed with such other engines.

The engine 21 is comprised of a cylinder block, indicated generally by the reference numeral 22, having two angularly inclined cylinder banks 23 and 24, each of which is formed with four respective cylinder bores 25. In the illustrated embodiment, the angle between the cylinder banks 23 and 24 is 90°.

Pistons 26 are slidably supported within each of the cylinder bores 25. These pistons 26 are connected by means of piston pins 27 to the upper or small ends of respective connecting rods 28. As is typical with V-type engine practice, the cylinder bank 23 is staggered slightly in an axial direction relative to the cylinder bank 24 so that the connecting rods 28 of respective cylinders of the banks 23 and 24 can be journaled on common throws 29 of a crankshaft 31. The crankshaft 31 is rotatably journaled in a well-known manner within a crankcase chamber formed by a skirt 32 of the cylinder block 22 and a crankcase member 33 that is detachably affixed thereto in a known manner.

The construction of the cylinder block 22 and those components which are contained within it and the crankcase member 33 may be considered to be conventional. Since the invention deals primarily with the induction system, to be described later, further details of the construction of the lower portion of the engine is not believed to be necessary to permit those skilled in the art to practice the invention. For that reason, further description of these conventional components will not be made.

Cylinder heads 34 are affixed to each of the cylinder banks 23 and 24 in a manner which will be described. Also, the detailed construction of the cylinder heads 34 and the mechanisms contained therein will be described by reference to FIG. 2 and a related, copending application. Cam covers 35 are affixed to the cylinder heads 34 in a manner which will also be described.

It should be noted that the cylinder banks 23 and 24 and the attached cylinder heads 34 and attached cam covers 35 define a valley between them, which valley is indicated generally by the reference numeral 36. An induction system, indicated generally by the reference numeral 37 and which also will be described later in more detail by reference to the remaining figures since it embodies the invention, is disposed in this valley 36 for supplying a fuel-air charge to the individual combustion chambers of the engine 21.

Exhaust manifolds 38 are affixed to the outer sides of the cylinder heads 34 and discharge the exhaust gases to the atmosphere through any conventional type of exhaust system (not shown).

The configuration of the combustion chambers for the invention will now be described by primary reference to FIG. 2. It should be initially noted that the cylinder heads 34 for each of the cylinder banks 23 and 24 are substantially identical in construction, with the cylinder head 34 for the bank 23 being placed onto the bank 23 in the one direction. When the same cylinder head 34 is attached to the cylinder bank 24, the head 34 will be reversed from this position. This permits the use of a single casting for both sides of the engine 21 with obvious cost advantages.

The cylinder head 34 has a lower sealing surface 38 that is affixed to the upper end of the respective cylinder block 23 or 24 in a manner which will be described so as to effect a tight gas seal therewith. The cylinder head surface 38 is provided with individual recesses 39 which cooperate with the cylinder bores 25 and the heads of the pistons 26 to form the combustion chambers for the engine 21. In a preferred form, the combustion chambers have a generally lens-shaped configuration, as described in the copending application of Masaaki Yoshikawa, entitled "Engine Combustion Chamber and Air Intake Device," Ser. No. 08/345,539, filed Dec. 13, 1994, and assigned to the assignee hereof. Where any details of the combustion chamber configuration are not described herein, reference may be had to that copending application, the disclosure of which is incorporated herein by reference, for such details.

Figure 2:
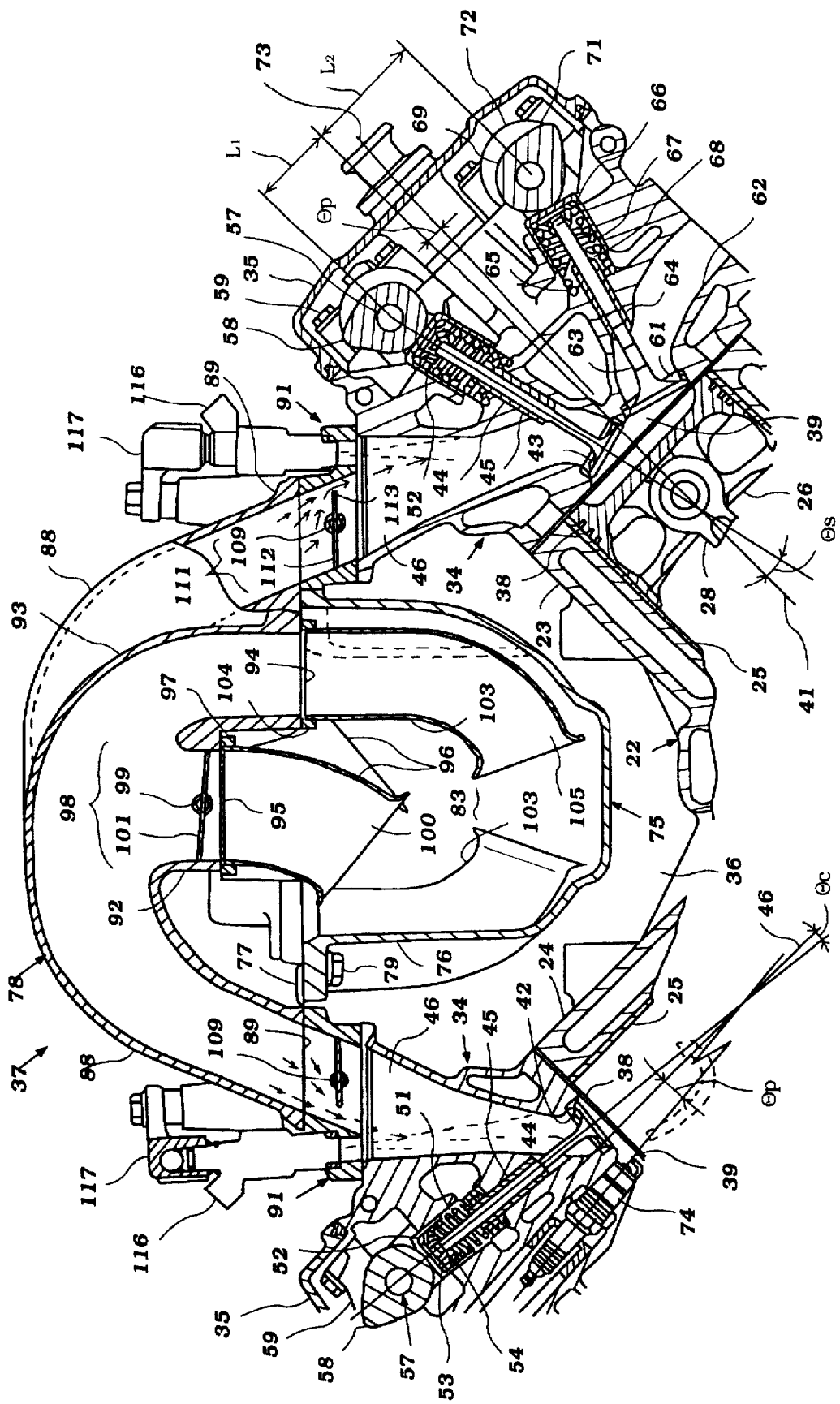
FIG. 2 is a partial cross-sectional view taken through the cylinder head and induction system for the engine along a plane that extends transversely and which passes through one cylinder bore of each bank.
Figure 3:
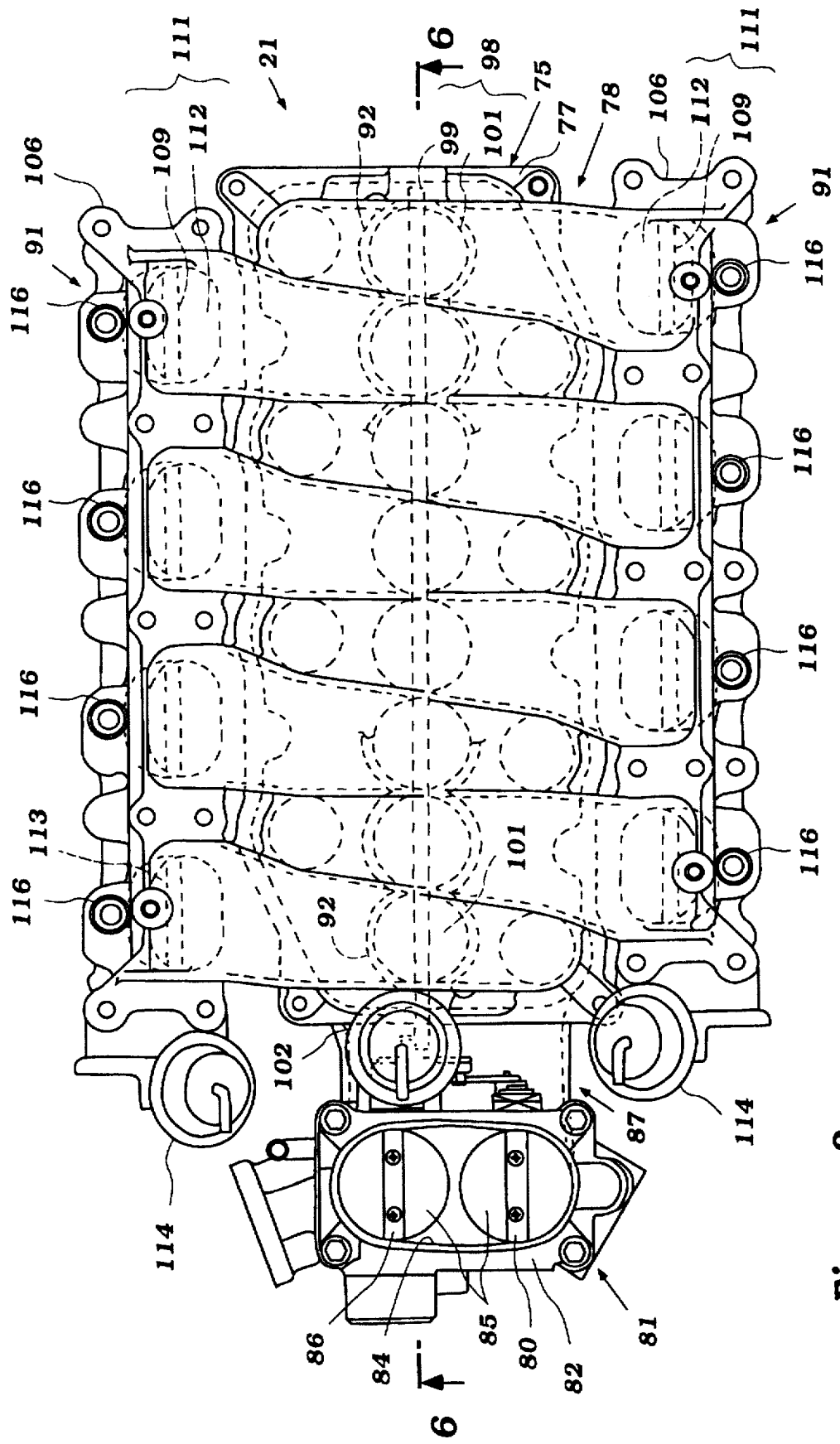
FIG. 3 is a top plan view of the intake manifold and throttle control for the engine.
Figure 4:
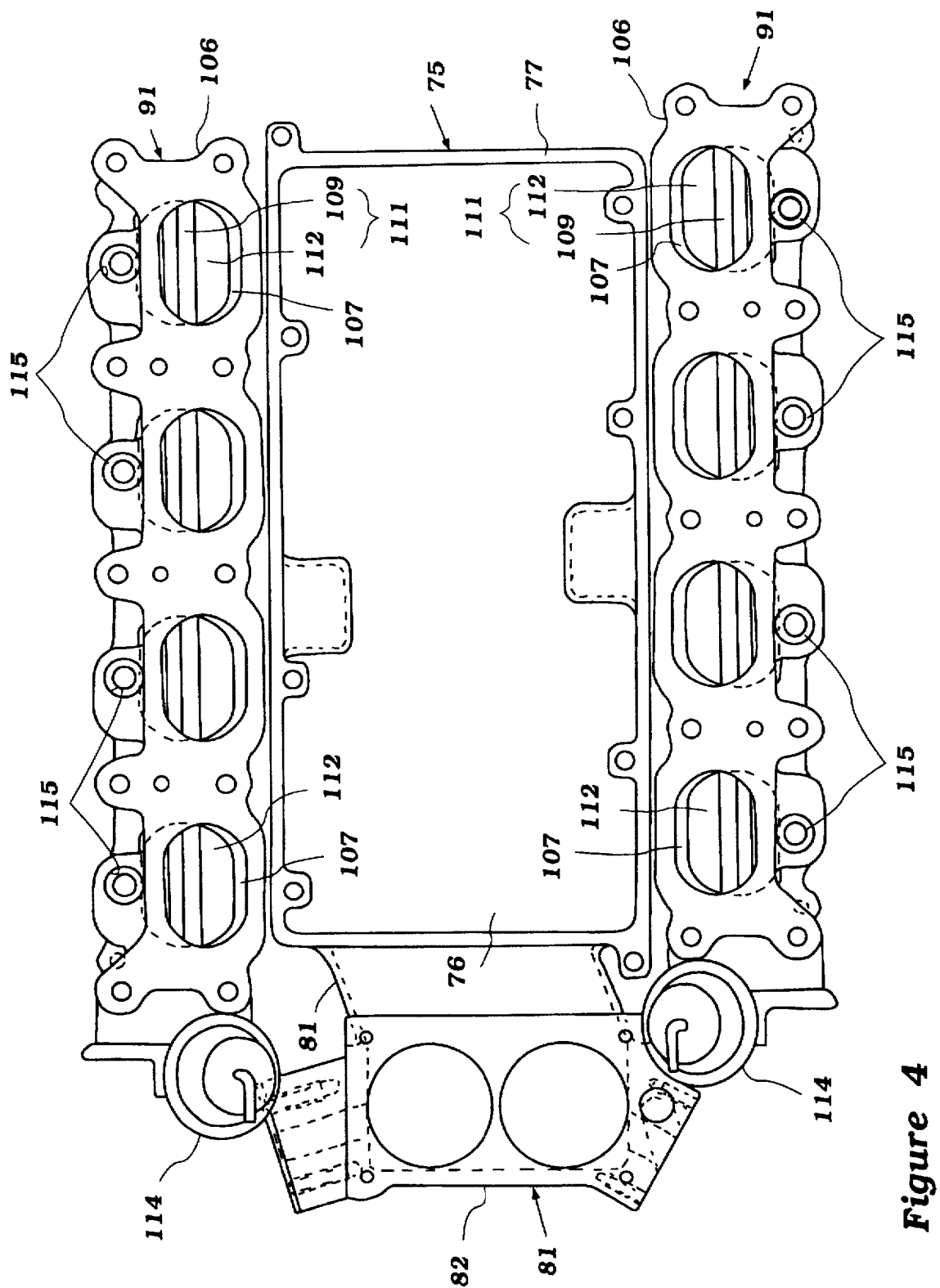
FIG. 4 is a view of the engine and control valve assembly with the intake manifold removed.
Figure 5:
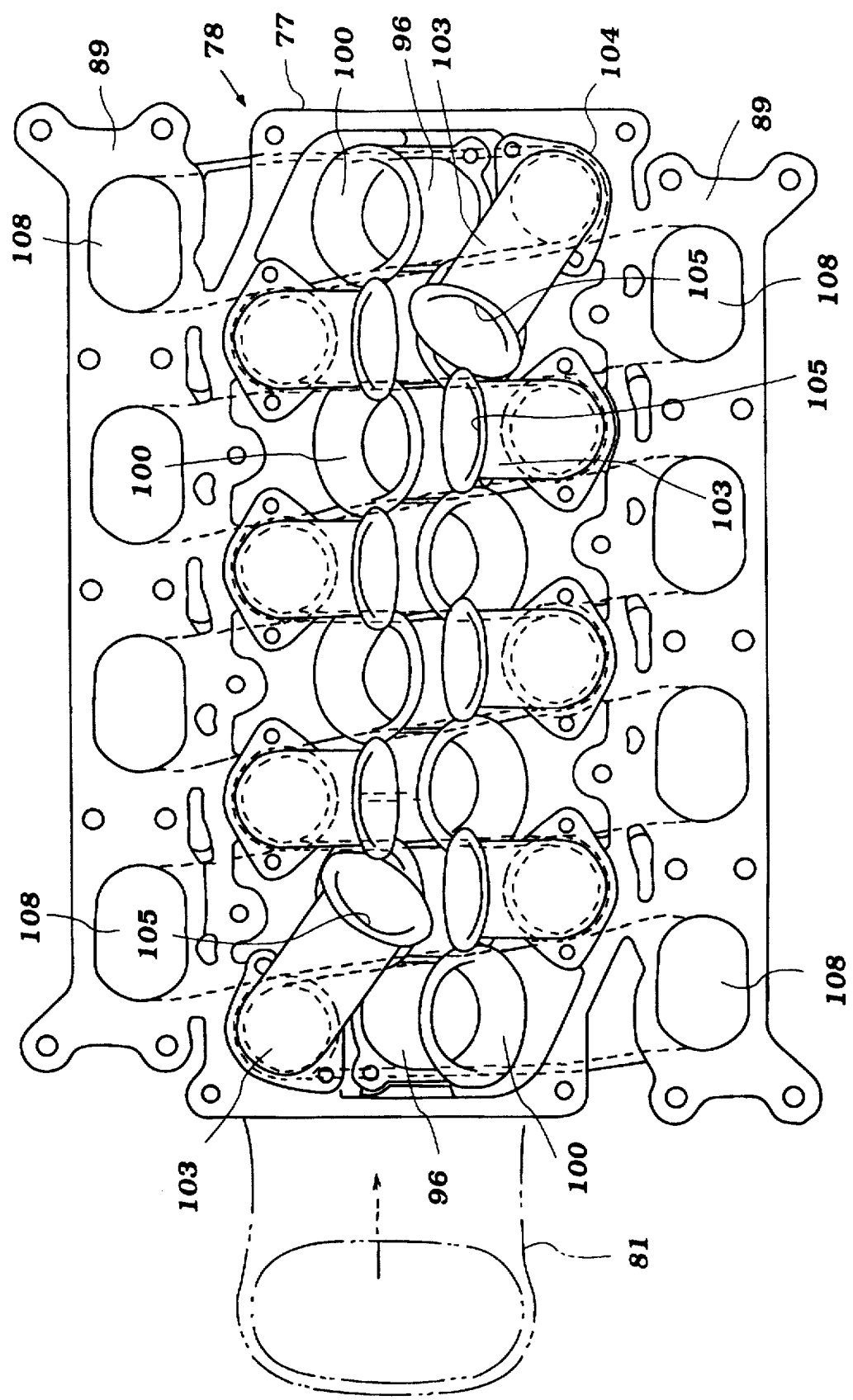
FIG. 5 is a bottom plan view of the structure shown in FIG. 4, but deleting the flow-controlling valves and plenum chamber lower closure to show the interior configuration of the plenum chamber.
Figure 6:
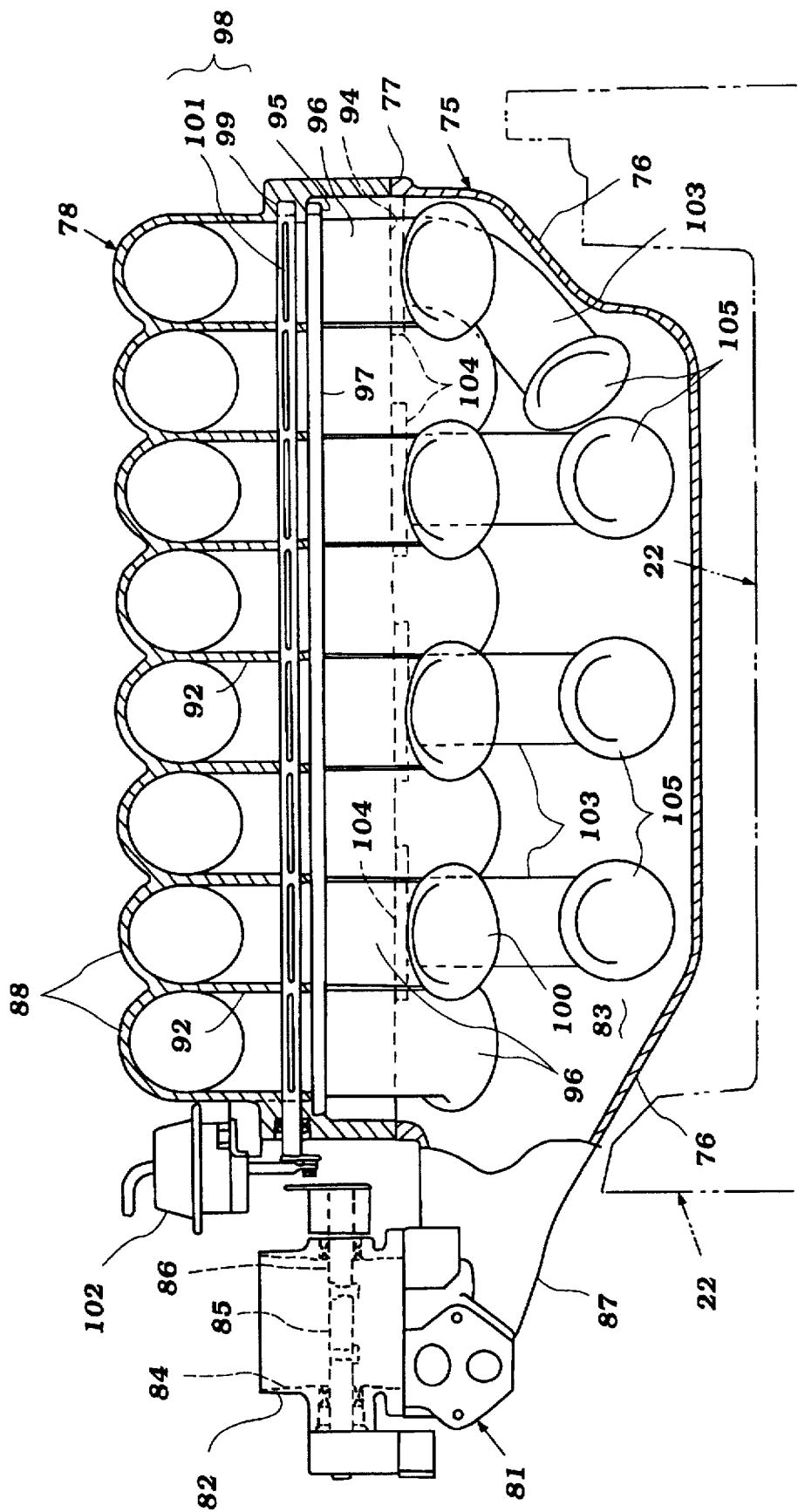
FIG. 6 is a cross sectional view of the intake manifold and throttle valve assembly, taken along the line 66 of FIG. 3.
Figure 7:
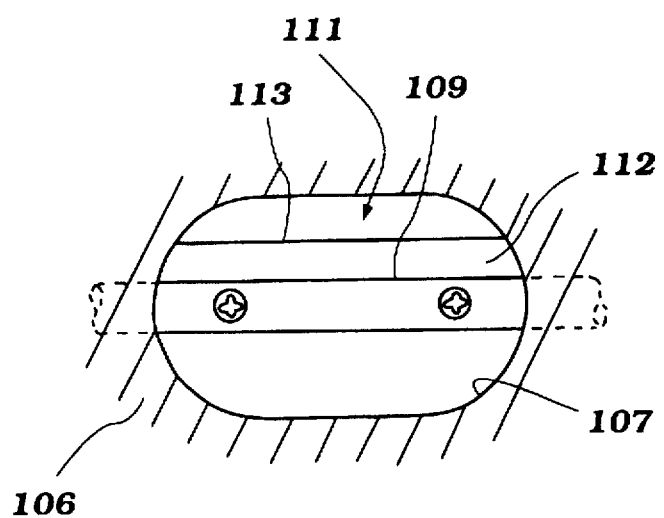
FIG. 7 is an enlarged cross-sectional view showing one of the flow-controlling valves.

The axes of the individual cylinder bores 25 are indicated in FIG. 2 and identified by the reference numeral 41 for orientation purposes. On one side of a plane containing the cylinder bore axis 41 there is provided a center intake valve seat 42, and this appears in FIG. 2 at the left-hand side of the figure. This intake valve seat 42 is disposed generally on the outer periphery of the cylinder bore 25 and is spaced the greatest distance from the cylinder bore axis 41.

A further pair of side intake valve seats 43 are disposed closer to the cylinder bore axis 41, but are positioned so as to extend in part across the aforenoted plane containing the cylinder bore axis 41. This is shown on the right-hand side of FIG. 2.

Respective poppet-type intake valves 44 are slidably supported in the cylinder head 34 by pressed or cast-in guides 45 and control the flow through the valve seats 42 and 43. The reciprocal axis of the intake valve 44 associated with the cent valve seat 42 is disposed at an acute angle $\theta_c$ to a plane A, which plane is parallel to the cylinder bore axis 41 and to the aforenoted plane containing it. This plane A is offset from the plane containing the cylinder bore axis 41 toward the valley 36 between the cylinder banks 23 and 24.

The intake valves 44 associated with the side intake valve seats 43 have their reciprocal axes lying in a common plane. This plane is also disposed at an acute angle to the plane A and the plane for containing the axis 41. This acute angle, indicated by the dimension $\theta_s$, is greater than the acute angle $\theta_c$.

An intake passage arrangement, indicated generally by the reference numeral 46, extends from outer surface 47 of the cylinder heads 34 on the side adjacent the valley 36 and is served by the intake system 37 in a manner which will be described. The intake passage arrangement 46 in this embodiment is of a Siamesed-type intake passage that serves all of the valve seats 42 and 43. However, as shown schematically in FIGS. 11–13, other arrangements are possible, such as the use of a Siamesed-type passage 48 that serves the center intake valve seat 42 and one of the side intake valve seats 43. In that embodiment, a further intake passage 49 extends from the cylinder head surface 47 and terminates at the remaining side intake valve seat 43.

Referring again to FIG. 2, coil compression springs 51 encircle the stems of the intake valves 44 and bear against machined surfaces on the cylinder head 34 and keeper retainer assemblies 52 fixed to the upper ends of the stems of the valves 44 for urging the valves 44 to their closed positions. Thimble tappets 53 are slidably supported in tappet-receiving bores 54 formed in the cylinder head 34 for actuating the valves 44. The bores 54 are disposed at the same angle as the reciprocal axes of their respective valve stems 44.

An intake camshaft, indicated generally by the reference numeral 57, is rotatably supported in the cylinder head 34 in a manner which will be described. This intake camshaft 57 is driven in a manner which will also be described at one-half crankshaft speed. The intake camshaft 57 is provided with three cam lobes 58 for each cylinder which it serves and which are spaced apart by bearing surfaces. These bearing surfaces are, in turn, journaled in the cylinder head 54 in bearings formed integrally in the cylinder head.

The intake camshaft 57 is supported for rotation by bearing caps 59 that are affixed to the cylinder head 34 in the manner described in the copending application of Tateo Ayoma and Masahiro Uchida, entitled "Cylinder Head Arrangement for Multi-Valve Engine," Ser. No. 08/363,412, filed concurrently herewith and assigned to the assignee hereof now issued as U.S. Pat. No. 5,535,714 on Jul. 16, 1996. In fact, that copending application discloses further details of the construction of the cylinder head 34, the way in which the tappet-receiving bores 54 are formed, and other details of the cylinder head arrangement. That disclosure is incorporated herein by reference. Since this invention deals primarily with the induction system for the engine, it is believed that the details of the construction of the cylinder heads except for what are given herein are not necessary for those skilled in the art to practice the invention.

Continuing to refer to FIG. 2, a pair of exhaust valve seats 61 are formed in the cylinder head recesses 39 on the side of the plane 41 opposite to the center intake valve seat 42. These side exhaust valve seats 61 are formed at the beginning of exhaust passages 62, which extend through the exhaust side of the cylinder heads 34 and which terminate at the exhaust manifolds 38 previously referred to and illustrated in FIG. 1. The exhaust passages 62 may be of the Siamesed type, or if preferred, individual passages may be employed for each exhaust valve seat 61.

Exhaust valves 63 are slidably supported for reciprocation in the cylinder head 34 by valve guides 64 that are inserted into the cylinder head 34 in any suitable manner. The axes of reciprocation of the exhaust valves 63 lie in a common plane that is disposed at an angle $\theta_e$ to the plane containing the cylinder bore axis 41. The angle $\theta_e$ is less than or equal to the angle $\theta_s$ of the side intake valves and substantially greater than the angle $\theta_c$ of the center intake valve.

Coil compression springs 65 encircle the stems of the exhaust valves 62 and act upon keeper retainer assemblies 66 for urging these valves to their closed position in seating engagement with the valve seats 61.

The exhaust valves 63 are opened by thimble tappets 67 that are slidably supported in bores 68 formed in the cylinder head 34. The bores 68 extend parallel to the axes of reciprocation defined by the valve guides 64 and extend downwardly from the upper cylinder head surface, as described in the aforenoted copending application, Ser. No. 08/363,412.

An exhaust cam shaft 69 is provided that has individual cam lobes 71 that engage each of the exhaust valve tappets 67 for operating them. The exhaust cam shaft 69 is journaled in the cylinder head 34 in the manner also described in copending application Ser. No. 08/363,412, which includes bearing caps 72.

As has been noted, the intake and exhaust cam shafts 57 and 69 are driven from the engine crankshaft 31 at one-half crankshaft speed. Any of a wide variety of types of cam shaft drives may be employed, including that described in copending application Ser. No. 08/363,412. As seen in FIG. 2, the intake camshaft 57 rotates about a rotational axis that is disposed at a lesser distance $L_1$ from the cylinder bore axis 41 than is the axis of rotation of the exhaust camshaft 69, this latter distance being indicated by the reference character $L_2$.

The area between the intake and exhaust camshafts 59 and 61 centered over each of the cylinder bores 25 is provided with a spark plug well that extends along an axis indicated at 73 and which is disposed at an acute angle $\theta_p$ relative to the plane containing the cylinder bore axis 41. A spark plug 74 is disposed at the lower end of this well for each cylinder bore 25 and extends into the cylinder head recess 39 for firing the charge which is introduced thereto through the induction system which will now be described.

The induction system 37 of this embodiment will now be described by primary reference to FIGS. 1–10. As has been noted, this induction system 37 is positioned in the valley 36 between the cylinder banks 23 and 24 and cooperates with the cylinder head surfaces 47 for supplying a fuel air charge to the induction passage 46 of the cylinder heads 34.

The induction system 37 includes a plenum chamber, indicated generally by the reference numeral 75 and which extends generally longitudinally of the engine through the valley 36. The plenum chamber 75 is spaced from the cylinder block 22 and cylinder heads 34 so as to define an air path therearound through which air can circulate for cooling. This improves the volumetric efficiency of the engine.

The plenum chamber 75 is formed from an open topped box-like member 76 that has its open upper face closed by a flange 77 of an intake manifold, indicated generally by the reference numeral 78, that is affixed thereto by threaded fasteners 79 (FIG. 2). A throttle body 81 (FIGS. 3–6) having a body portion 82 is affixed to the front of the plenum chamber 75 and supplies air to its interior 83. The throttle body 81 receives air from a suitable air inlet device (not shown) and has an inlet opening 84 in which a pair of flow controlling throttle valves 85 are supported for rotation on respective throttle shafts 86. The throttle valves 85 are operated by a suitable external accelerator control and open in unison.

The throttle body 81 has a curved section 87 downstream of the throttle valves 85 and which blends into the plenum chamber 75 so as to deliver the air to its internal chamber 83. Various types of sensors such as a temperature sensor and/or air flow sensor (not shown) may be associated with the throttle body 81 for sensing the condition and volume of the air inducted.

The intake manifold assembly 78, which includes a plurality of runner sections, indicated generally by the reference numeral 88, which all have flanges 89 that are common with the flange 77 that closes the upper end of the plenum chamber 75. These flanges 88 are affixed to a control valve assembly, indicated generally by the reference numeral 91, at each cylinder head surface 47.

From the flanges 89, the runner sections 88 include tubular portions that extend upwardly and then transversely across the valley 36. In the area above the plenum chamber 75, the manifold runners 88 divide into a pair of branch sections which are comprised of a first high-speed branch section, indicated by the reference numeral 92, and all of which are disposed on the longitudinal centerline of the engine. It should be noted that the runners 88 from the cylinder bank 23 extend transversely across toward the cylinder bank 24, while the runners 88 extending from the cylinder bank 24 extend transversely across toward the cylinder bank 23. The branch sections 92 for the runners 88 from each cylinder bank lie in a common longitudinal plane, for a reason which will be described.

A second branch section 93 also branches off the main section 88 and extends parallel to the first branch section 92 in a re-entrant fashion with the section 88, but which is disposed adjacent the opposite cylinder bank. That is, the branch sections 93 from the cylinder bank 24 terminate adjacent the cylinder bank 23. Those branch sections 93 from the cylinder bank 23 terminate adjacent the cylinder bank 24. These branch sections 93 terminate in lower end surfaces 94 which extend in the same plane as the flanges 89 and 77. The branch sections 92 terminate in lower end faces 95 that are positioned vertically above the end surfaces 94.

The branch sections 92 are tuned for high-speed volumetric efficiency and good running. To further assist in their tuning each has affixed to it within the plenum chamber 75, and specifically its internal volume 83, tuning tubes 96 which have flange portions 97 that are affixed to the lower ends 95 of the branch sections 92 in a suitable manner. The tuning necks 96 are curved back toward the respective cylinder bank from which they originated and terminate in inlets 100. The combined length of the tuning necks 96, branch portions 92, and common portion 88, as well as the intake passages 46 of the cylinder head, have a length that is chosen to provide good volumetric efficiency for the engine when running at high-speed, high-load conditions.

A throttle valve mechanism, indicated generally by the reference numeral 98, is provided for controlling the flow through these high-speed branch passages. This throttle valve assembly 98 is positioned in the branch portion 92 of the intake manifold 78 and includes a longitudinally extending throttle valve shaft 99. Since the branch passages 92 are offset from the branch passages 93, the throttle valve shaft 99 extends only through the branch passages that are designed to be throttled. Thus, the throttle valve shaft 99 and the individual throttle valves 101 which are affixed to it and which complete the throttle valve assembly 98 only pass through the branch passage which they control.

Figure 8:
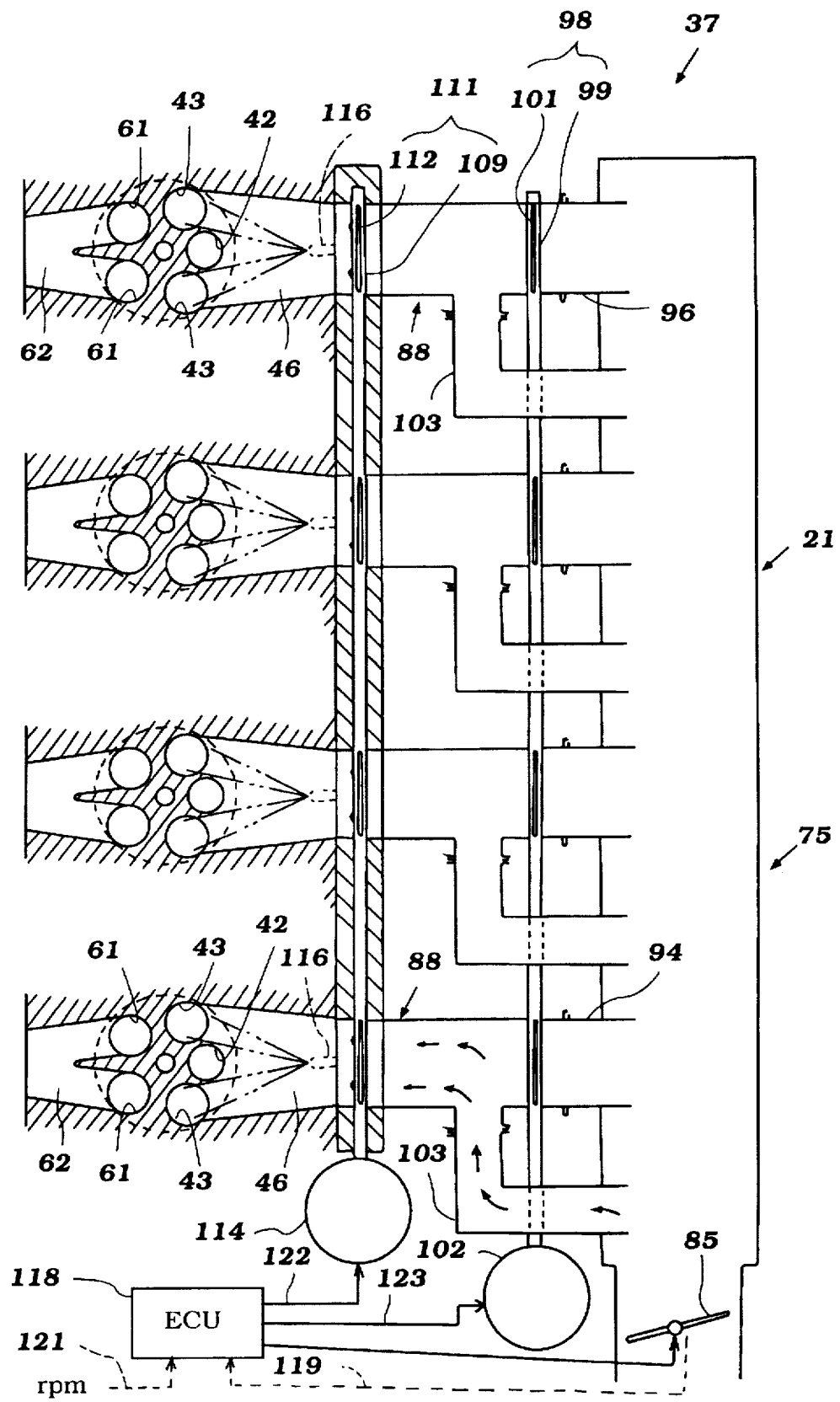
FIG. 8 is a partially schematic cross-sectional view showing one cylinder bank and its induction system when operating at an idle or low-speed condition and showing the position of the throttle valves and flow control valves.

A suitable servomotor such as a vacuum motor 102 is affixed to the forward end of the throttle valve shaft 99 and operates the throttle valve assembly 98 in a control sequence which will be described later by reference to FIGS. 8–10. This vacuum motor 102 may be controlled either by a staged linkage system or, more preferably, by an ECU that is programmed with the desired control strategy.

Longer tuned intake trumpets 103 have flange portions 104 that are affixed to the underside of the plate section 77 of the intake manifold 78 and which register with the secondary branches 93 of each intake runner 78. These longer tuned tubes 103 have inlet ends 105 disposed at the lower end of the plenum chamber 83 and are tuned to provide better induction efficiency in the low and mid-range speeds. It should be noted that the tuning tube 103 associated with the first cylinder of the bank 23 and the tuning tube 103 associated with the last cylinder of the bank 24 are rotated so that these will face inwardly while the remaining tubes extend generally parallel to the high-speed tubes 99. As may be readily seen from FIG. 5, this permits the plenum chamber to be narrower at the front and rear ends of the engine than the remainder of the plenum chamber 75. This accommodates other engine accessories and maintains a compact intake system while at the same time permitting the desired tuning effect to be obtained.

The construction of the control valve assemblies 91 will now be described by reference to FIGS. 2–4 and 7. It should be noted that the induction system 37 as thus far described and the configuration of the cylinder head induction passages 46 are such that the charge that enters the combustion chambers will flow relatively smoothly and with a relatively small amount of turbulence. However, the positioning of the side intake valve seats 42 is such that the air flow into the combustion chambers from them will have some tumble type motion. However, the induction system per se is designed so as to minimize flow restrictions to maximize volumetric efficiency. This, however, may give rise to poor or low speed running characteristics wherein turbulence is desirable.

The control valve assemblies 91, are employed so as to redirect the charge and give a turbulence factor to it. The control valve assemblies 91 each include a valve body 106 which, as has been noted, is interposed between the manifold runners flanges 89 and the induction passages 46 of the cylinder heads 34. This body 106 is formed with flow passages 107 that are generally complementary to the configuration of the combined shape of the intake passages 46, and specifically outlet openings 108 of the intake manifold runners 78.

A control valve shaft 109 of a control valve 111 is journaled in each body 106 and extends transversely across the passages 107. Plate-type control valves 112 are affixed to this shaft 109 and complete the control valve 111. It should be noted that the plate-type valves 112 are provided with cut-outs 113 that are disposed on one side thereof. Hence, when the control valve 113 is in its closed position, as shown in FIG. 2, the intake charge flowing through the induction system 37 will be directed toward the side of the valve seats 42 and 43 closest to the cylinder bore axis 41. This will then cause the air to enter the combustion chambers and specifically the combustion chamber recesses 39 in a direction to create a tumble motion in the cylinders.

Vacuum-type servo motors 114 are affixed to the ends of the valve bodies 106 and are operated by a suitable ECU or other control arrangement so as to close the controls valve 111 at low and mid-range speeds so as to generate this turbulence. At high speed and high loads, however, the control valves 111 are positioned in their full open position and hence will generate little restriction to air flow and maximum volumetric efficiency.

Finally, the control valve assembly 91, and specifically the valve body 106, is provided with a plurality of injection nozzle openings 115 which receive suitable fuel injectors such as electrically operated fuel injectors 116. The fuel injectors 116 are fed by fuel rails 117 and spray fuel into one side of the intake passages 46. This spray is on the side where the cutout 113 of the control valves 112 is positioned so that when the control valve assembly 111 is in its tumble-generating position as shown in FIG. 2, the turbulent air flow will pass the spray from the nozzles 116 and effect good fuel/air mixing.

The sequence of operation of the control valves 111 and the secondary throttle valves 98 will now be described by reference to FIGS. 8–10. FIG. 8 shows the condition when operating at idle and at low speeds. Under this condition the control valves 111 are positioned as shown in FIG. 2, and thus are fully closed so as to generate the tumble motion as aforenoted. At this same time, the secondary throttle control valves 98 will also be closed so that the long, low-speed efficient air induction path from the plenum chamber 75 to the combustion chambers will be effective. Thus, the engine is tuned for good induction efficiency, and also the control valves 111 will generate turbulence in the intake charge so as to improve combustion efficiency and flame propagation.

The system is controlled by an ECU, indicated generally by the reference numeral 118, which receives signals indicative of the position of the manually operated throttle valve from a throttle position sensor (not shown), which signal is indicated schematically at 119. The position of the throttle valve 85 is an indication of engine load.

In addition and in accordance with the exemplary control strategy, the ECU also receives a signal, indicated at 121, of engine speed. Thus, at low engine speeds and low loads (low throttle valve positions), both the secondary throttle valves 98 and the flow control valves 111 are closed.

Figure 9:
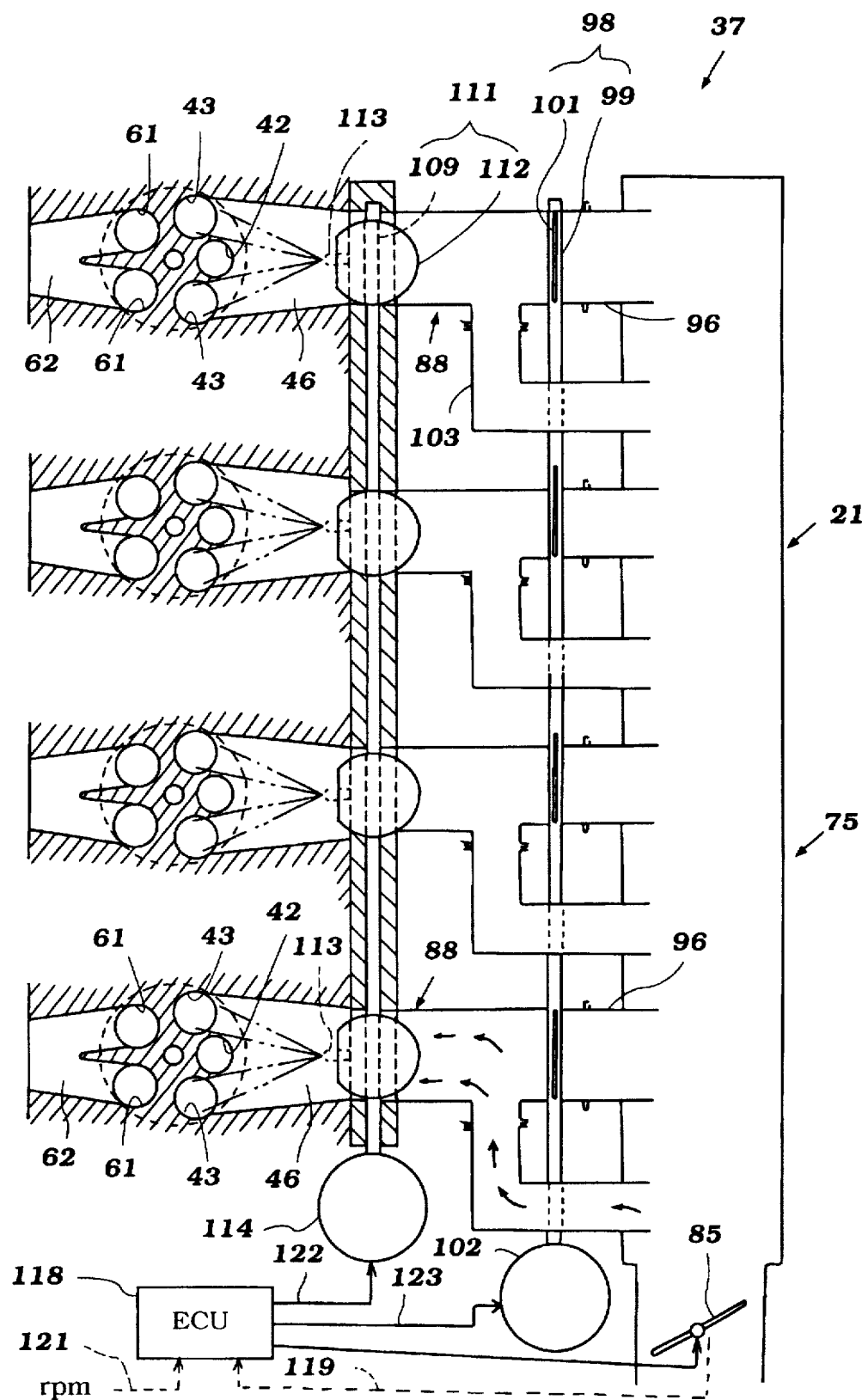
FIG. 9 is a schematic view, in part similar to FIG. 8, and shows the condition of the valves when operating in an off idle low or low/mid-range condition.

As the speed and/or load increases to the low or mid-ranges, then the ECU outputs a signal, indicated at 122 in FIG. 9, to the servomotor or vacuum motor 114 so as to begin to or fully open the flow control valves 111. When this occurs, the tumble action will be diminished, and there will be less turbulence in the intake charge. Hence, volumetric efficiency will be improved. However, still the long flow path provided by the primary or longer low-speed induction branch will supply the combustion chambers, and accordingly, there will be good charging efficiency.

Figure 10:
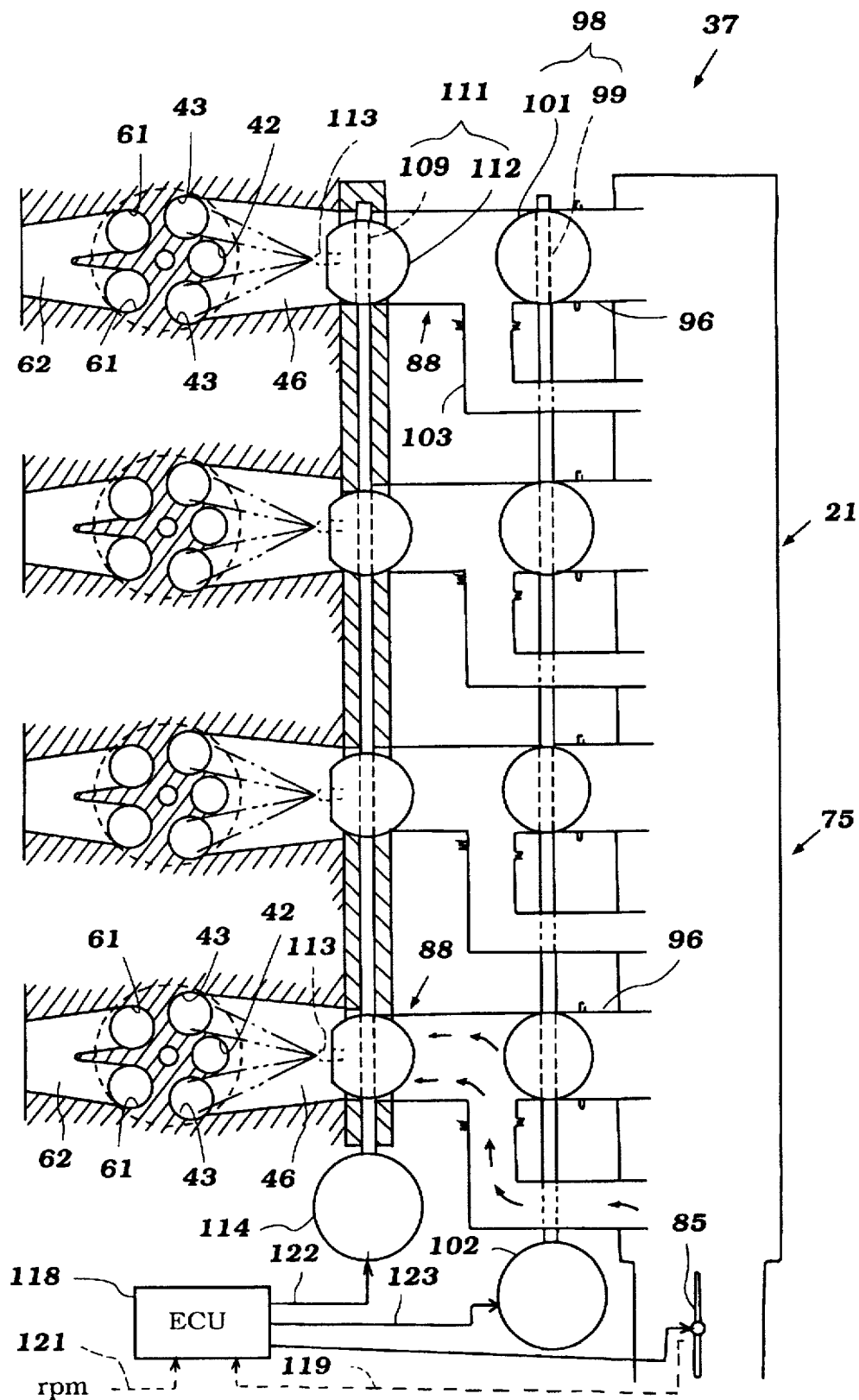
FIG. 10 is a partially schematic view, in part similar to FIGS. 8 and 9, and shows the wide open throttle condition.

As the engine reaches its high-speed, high-load condition, as shown in FIG. 10, the ECU 118 continues to send the signal 122 to the servomotor 114 to keep the flow control valve 111 in its opened position, but it will also send a signal 123 to the servomotor 102 for operating the secondary throttle valves 98 to open them. The rate and degree of the opening will be determined by the desired control strategy and performance.

Figure 11:
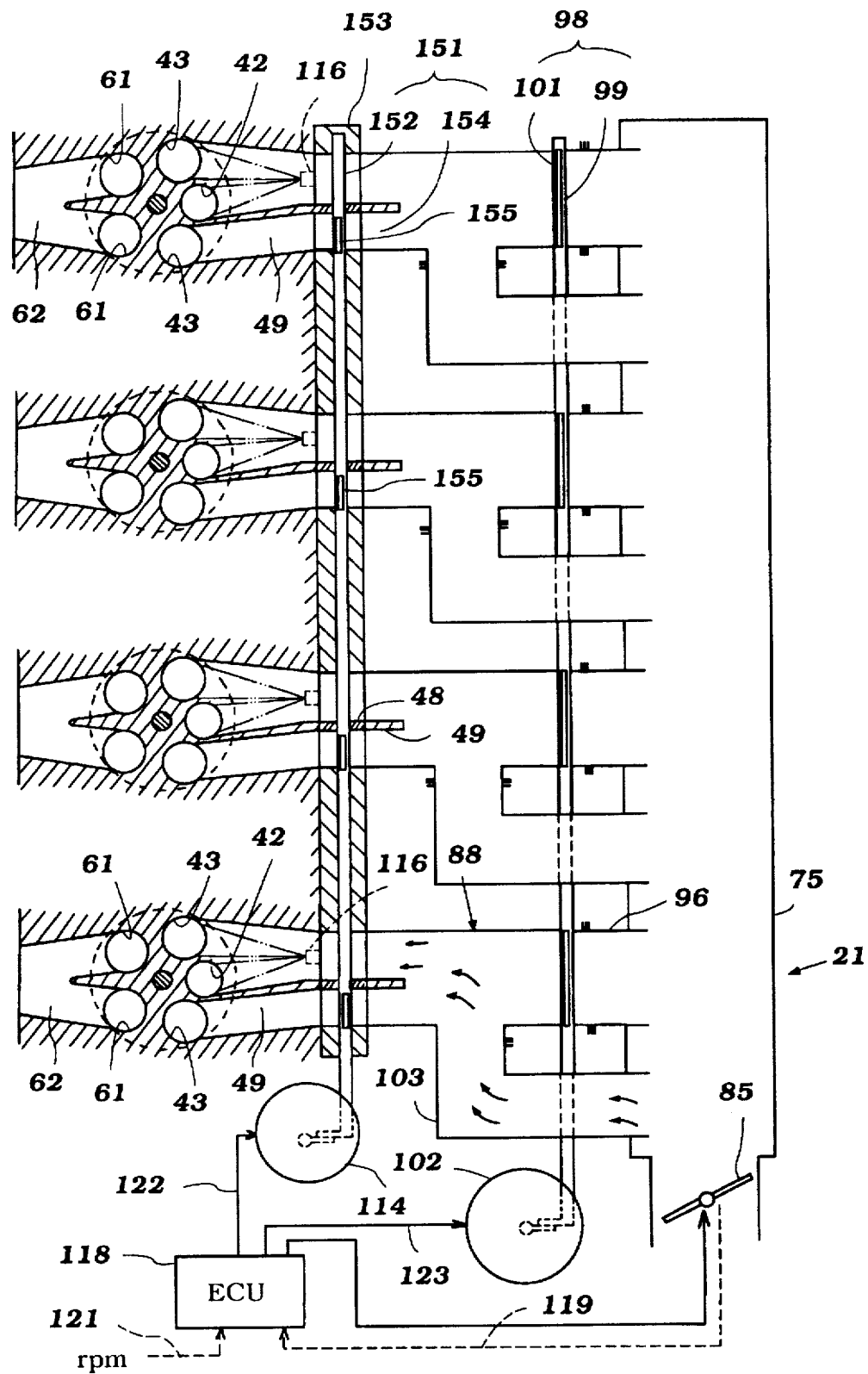
FIG. 11 is a partially schematic cross-sectional view, in part similar to FIG. 8, and shows another embodiment of the invention when operating at idle or low speed.
Figure 12:
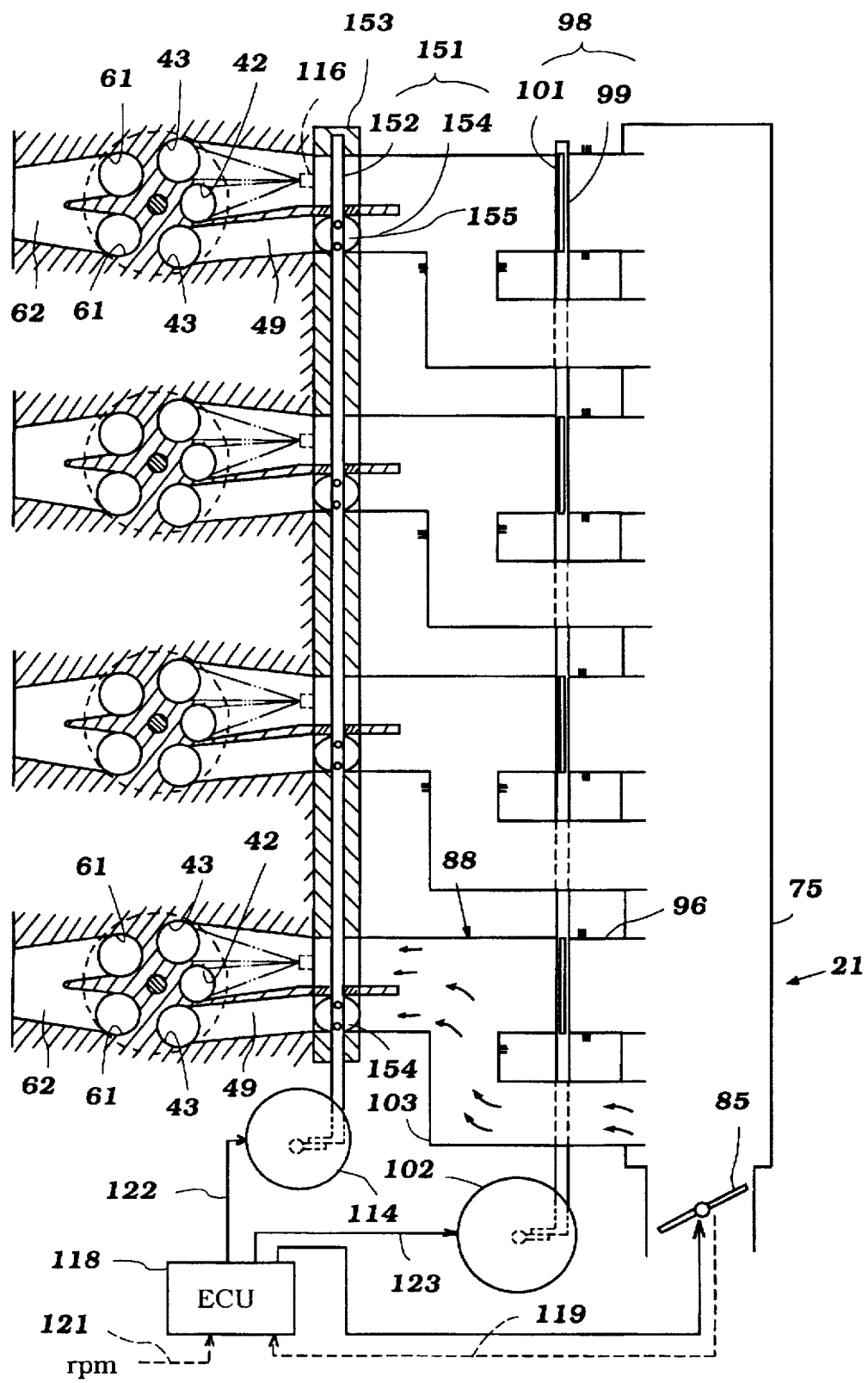
FIG. 12 is a view, in part similar to FIG. 11, and also showing a condition the same as that of FIG. 9; that is, when the engine is operating at a low-speed, low-load condition but at a higher speed range than that of FIG. 11.
Figure 13:
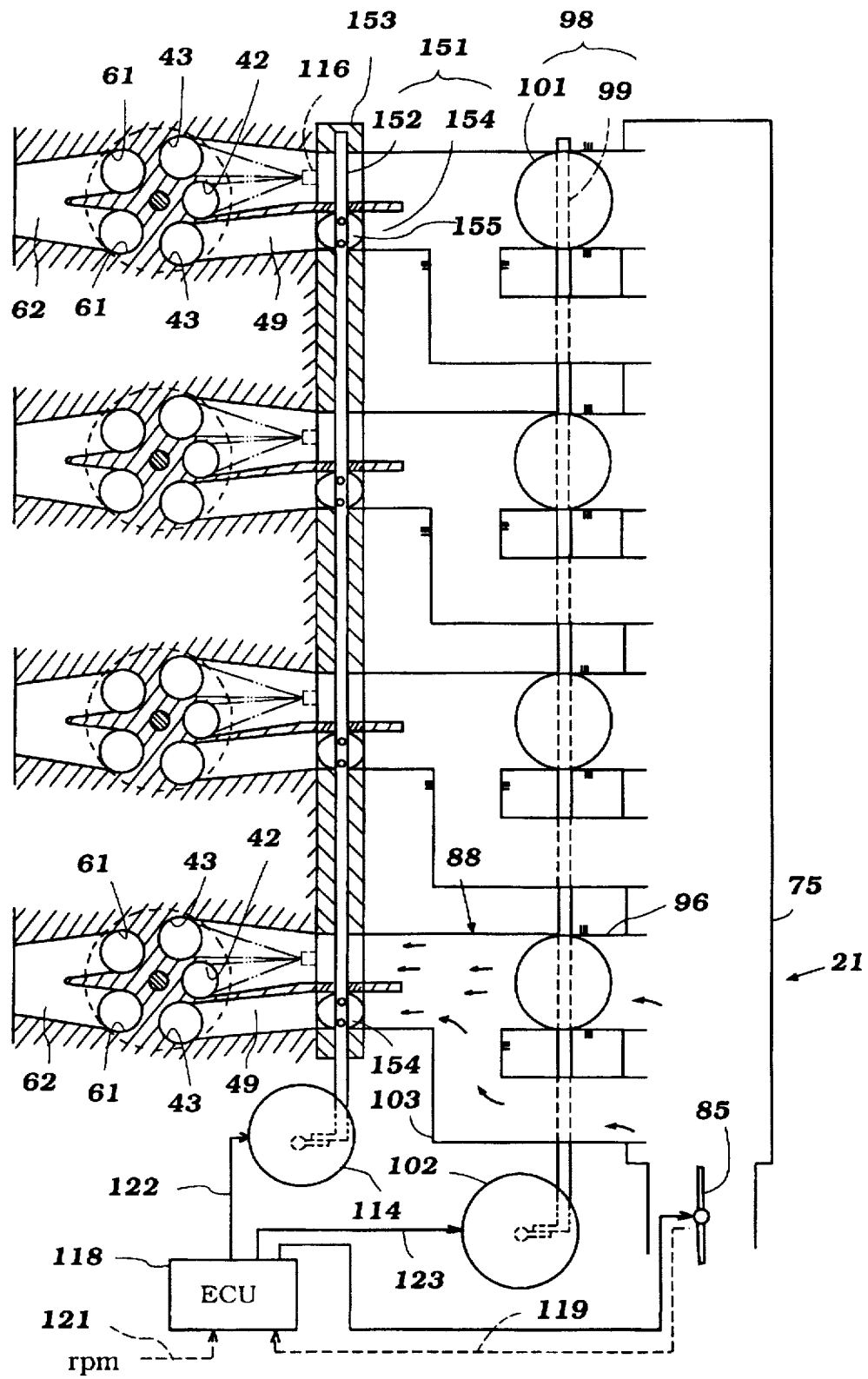
FIG. 13 is a view, in part similar to FIGS. 11 and 12, and shows the same condition as FIG. 10; that is, wide open throttle.

FIGS. 11–13 show another embodiment of the invention. This embodiment differs from the previously described embodiment in the manner in which the turbulence is generated in the combustion chamber. With the previously described embodiment, the turbulence has been primarily generated by a tumble action. With this embodiment and as has been previously noted, two intake passages 48 and 49 provided. In this situation the intake passage 48 serves one side intake valve seat 43 and the center intake valve seat 42. The intake passage 49 serves the remaining side intake valve seat 43.

In this embodiment, a flow control valve assembly, indicated generally by the reference numeral 151, is provided that includes a control valve shaft 152 journalled in a valve body 153 and which controls the flow through only a series of passages 154 that communicate with the intake passage 49. Control valve elements 155, which may be of the butterfly type and which are not interrupted, are disposed in these passages 154.

Thus, when the control valve assembly 151 is closed, as it is at low-speed, low-load conditions, then the entire intake charge enters the combustion chambers through only the intake passage 48. The flow velocity will increase, and this will generate both a tumble and swirl to the intake charge so as to create greater turbulence and more rapid flame propagation.

In this embodiment, the fuel injectors 116 inject only into the intake passages 48, but they inject adequate fuel even to serve the high-speed, high-load conditions when the intake passages 49 have full flow, as when the control valves 155 are in their fully opened position which occurs, as with the previously described embodiment, as mid-range performance is approached by opening of them by the servomotor 114, as shown in FIG. 12.

Under high-speed, high-load conditions, both the control valve assembly 155 and the secondary throttle valve assembly 98 are fully opened.

It should be readily apparent that the described induction system provides good charging efficiency under all running conditions and also the desired degree of turbulence under low-speed, low-load conditions so as to ensure rapid flame propagation and good combustion. Of course, the foregoing description is that of preferred embodiments of the invention, and various changes and modifications may be made without departing from the spirit and scope of the invention as defined by the appended claims.

We claim:

1. An induction control system for supplying a charge to an engine combustion chamber comprising intake passage means terminating at valve seat means in said combustion chamber, said intake passage means having first and second sections, each tuned to provide optimum charging efficiency at a different engine running condition, throttle valve means in at least one of said sections positioned and configured for controlling the flow volume through said sections without significantly changing the flow direction into said combustion chamber, and flow control valve means in said intake passage means said flow-control valve means being movable between a first position wherein the configuration of said flow-control valve means and the adjacent portion of said section causes the flow entering said combustion chamber to flow into said combustion chamber in a first flow path and a second position where the configuration of said flow-control valve means obstructs a portion of the section to cause the flow to enter said combustion chamber in a second flow path different from said first flow path.

2. An induction control system as in claim 1, wherein the first and second sections are tuned by providing different lengths therefor.

3. An induction control system as in claim 2, wherein the first and second sections each have a generally U-shaped configuration.

4. An induction control system as in claim 3, wherein there are multiple combustion chambers formed in a single cylinder head and the intake passage means is formed in part in said cylinder head.

5. An induction control system as in claim 4, wherein the longer sections of the intake passages extend generally parallel to the shorter sections, except for the longer passage at one end of the cylinder head which extends at least in part in a direction longitudinally of the engine.

6. An induction control system as in claim 1, wherein the first and second sections terminate in a common plenum chamber having an atmospheric air inlet in which a main manually operated throttle valve is provided.

7. An induction control system as in claim 6, wherein the throttle valve means and the flow control valve means are automatically controlled in response to an engine condition.

8. An induction control system as in claim 7, wherein the engine condition comprises at least engine speed and engine load.

9. An induction control system as in claim 8, wherein the control sequence for the automatically controlled valves is such that as the speed and load of the engine increases, the flow control valve means is opened first and the throttle valve means is opened at a higher speed and higher load.

10. An induction control system as in claim 1, wherein the intake passage means terminates in the combustion chamber in three valve seats.

11. An induction control system as in claim 10, wherein the three valve seats are served by a common section from which the first and second sections extend.

12. An induction control system as in claim 11, wherein the first and second sections terminate in a common plenum chamber having an atmospheric air inlet in which a main manually positioned throttle valve is provided.

13. An induction control system as in claim 12, wherein the throttle valve means and the flow control valve means are automatically controlled in response to an engine condition.

14. An induction control system as in claim 13, wherein the engine condition comprises at least engine speed and engine load.

15. An induction control system as in claim 14, wherein the control sequence for the automatically controlled valves is such that as the speed and load of the engine increases, the flow control valve means is opened first and the throttle valve means is opened at a higher speed and higher load.

16. An induction control system as in claim 11, wherein the first and second sections are tuned by providing different lengths therefor.

17. An induction control system as in claim 16, wherein the first and second sections each has a generally U-shaped configuration.

18. An induction control system as in claim 17, wherein there are multiple combustion chambers formed in a single cylinder head and the intake passage means is formed in part in said cylinder head.

19. An induction control system as in claim 18, wherein the longer sections of the intake passages extend generally parallel to the shorter sections, except for the longer passage at one end of the cylinder head which extends at least in part in a direction longitudinally of the engine.

20. An induction control system as in claim 10, wherein the engine is comprised of a pair of angularly disposed cylinder banks defining a valley therebetween, with each cylinder bank having at least one combustion chamber therein.

21. An induction control system as in claim 20, wherein the intake passage means is disposed in the valley between the cylinder banks.

22. An induction control system as in claim 21, wherein the first and second sections terminate in a common plenum chamber having an atmospheric air inlet in which a main manually positioned throttle valve is provided.

23. An induction control system as in claim 22, wherein the throttle valve means and the flow control valve means are automatically controlled in response to an engine condition.

24. An induction control system as in claim 23, wherein the engine condition comprises at least engine speed and engine load.

25. An induction control system as in claim 24, wherein the control sequence for the automatically controlled valves is such that as the speed and load of the engine increases, the flow control valve means is opened first and the throttle valve means is opened at a higher speed and higher load.

26. An induction control system as in claim 25, wherein the first and second sections are tuned by providing different lengths therefor.

27. An induction control system as in claim 26, wherein the first and second sections each has a generally U-shaped configuration.

28. An induction control system as in claim 27, wherein there are multiple combustion chambers formed in a each cylinder head and the intake passage means is formed in part in said cylinder heads.

29. An induction control system as in claim 28, wherein the longer sections of the intake passages extend generally parallel to the shorter sections, except for the longer passage at one end of each cylinder head which extends at least in part in a direction longitudinally of the engine.

30. An induction control system as in claim 1, wherein the control valve in its first position permits substantially unrestricted flow into the combustion chamber and when in its second position generates a tumble action in the combustion chamber.

31. An induction control system as in claim 30, wherein the intake passage means terminates in the combustion chamber in three valve seats.

32. An induction control system as in claim 31, wherein the tumble is generated through each of the valve seats.

33. An induction control system as in claim 30, wherein each of the valve seats is served by a Siamesed intake passage in a cylinder head and a single control valve is disposed in the common portion of the Siamesed passage.

34. An induction control system as in claim 33, wherein the control valve is a plate-type valve having a relief in one of its peripheral edges through which all flow must pass when the control valve is in its closed position.

35. An induction control system as in claim 31, wherein at least one of the valve seats is served by one intake passage in a cylinder head, the remaining valve seats being served by another intake passage and wherein the control valve controls the flow only through said one intake passage.

36. An induction control system as in claim 35, wherein the control valve means in its closed position prohibits flow through the one passage and when in its second position permits unrestricted flow through said one passage.

37. An induction control system as in claim 1, wherein there are multiple combustion chambers formed in a cylinder head with a plurality of intake ports formed in an outer surface thereof each of which comprises a portion of a respective intake passage means, each intake passage means being formed in part by a manifold having a plurality of runners, each extending at one end from said intake ports in a common section to first and second branch sections, each of a different length.

38. An induction control system as in claim 37, where the first branch sections are aligned in a direction extending parallel to said cylinder head outer surface, the throttle valve means comprising a single throttle valve shaft extending through all of said first branch sections and spaced from and not intersecting the second branch sections, and a plurality of throttle valves, each fixed to said throttle valve shaft in a respective one of said first branch sections for controlling the flow therethrough.

39. An induction control system as in claim 38, wherein the first and second branch sections terminate in a common plenum chamber having an atmospheric air inlet in which a main manually positioned throttle valve is provided.

40. An induction control system as in claim 39, wherein the first and second sections each have a generally U-shaped configuration.

41. An induction control system as in claim 40, wherein the throttle valve means and the flow control valve means are automatically controlled in response to an engine condition.

42. An induction control system as in claim 41, wherein the engine condition comprises at least engine speed and engine load.

43. An induction control system as in claim 42, wherein the control sequence for the manually operated vales is such that as the speed and load of the engine increases, the flow control valve means is opened first and the throttle valve means is opened at a higher speed and higher load.

44. An induction control system as in claim 40, wherein the first and second branch passages terminate at respective inlet ends that are spaced at different distances from the cylinder head outer surface and wherein the first branch sections are disposed at a lesser distance from the cylinder head outer surface than second branch sections.

45. An induction control system as in claim 44, wherein the engine has a pair of cylinder banks each having a respective cylinder head affixed thereto with the cylinder banks defining a valley therebetween, the outer surfaces of the respective cylinder heads being juxtaposed to said valley, the second branch passages of each of said cylinder heads terminating adjacent the other of said cylinder heads and said branch passages being disposed substantially between said cylinder head surfaces and the single throttle valve shaft passes through the first branch passages serving both of said cylinder heads.

46. An induction control system as in claim 1, wherein there are multiple combustion chambers formed in a cylinder head with a plurality of intake ports formed in an outer surface thereof each of which comprises a portion of a respective intake passage means, each intake passage means being formed in part by a manifold having a plurality of runners, each extending at one end from said intake ports in a common section to first and second branch sections, each of a different length.

47. An induction control system as in claim 46, wherein the first and second sections terminate in a common plenum chamber having an atmospheric air inlet in which a main manually positioned throttle valve is provided.

48. An induction control system as in claim 47, wherein the first and second sections each have a generally U-shaped configuration.

49. An induction control system as in claim 48, wherein the throttle valve means and the flow control valve means are automatically controlled in response to an engine condition.

50. An induction control system as in claim 49, wherein the engine condition comprises at least engine speed and engine load.

51. An induction control system as in claim 50, wherein the control sequence for the manually operated valves is such that as the speed and load of the engine increases, the flow control valve means is opened first and the throttle valve means is opened at a higher speed and higher load.

52. An induction control system as in claim 46, wherein the first and second branch passages terminate at their inlet ends at different distances from the cylinder head outer surface and wherein the first branch sections are disposed close to the surface than the second branch sections.

53. An induction control system as in claim 52, wherein the engine has a pair of cylinder banks each having a respective cylinder head affixed thereto with the cylinder banks defining a valley therebetween, the outer surfaces of the respective cylinder heads being juxtaposed to said valley, the second branch passages of each of said cylinder heads terminating adjacent the other of said cylinder heads and said branch passages being disposed substantially between said cylinder head surfaces and the single throttle valve shaft passes through the first branch passages serving both of said cylinder heads.

* * * * *

UNITED STATES PATENT AND TRADEMARK OFFICE
CERTIFICATE OF CORRECTION

PATENT NO. : 5,787,851
DATED : August 4, 1998
INVENTOR(S) : Sakurai et al

It is certified that error appears in the above-identified patent and that said Letters Patent is hereby corrected as shown below:

Column 11/Line 58 Claim 1, after *"chamber"*, insert --and controlling the direction of charge flow within said combustion chamber--;

Column 11/Line 65, Claim 1, after *"direction"*, insert --through said valve seat means--;

Column 12/Line 3, Claim 1, delete *"section"* and insert --said intake passage means causes--;

Column 12/Line 4, Claim 1, after *"chamber"*, insert --through said valve seat means to flow into said combustion chamber--;

Column 12/Line 6, Claim 1, delete *"portion of the section"* and insert --part of said adjacent portion of said intake passage means--;

Column 12/Line 7, Claim 1, after *"chamber"*, insert --through said valve seat means--;

Column 12/Line 8, Claim1, after *"path"*, insert --within said combustion chamber--.

Signed and Sealed this

Twelfth Day of September, 2000

*Attest:*

Q. TODD DICKINSON

*Attesting Officer*  *Director of Patents and Trademarks*